United States Patent
East et al.

(10) Patent No.: US 7,457,829 B2
(45) Date of Patent: Nov. 25, 2008

(54) RESYNCHRONIZATION OF MULTIPLE COPIES OF A DATABASE AFTER A DIVERGENCE IN TRANSACTION HISTORY

(75) Inventors: Jeffrey A. East, Sammamish, WA (US); Andrei Marinescu, Issaquah, WA (US); Michael I. Zwilling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 10/602,283

(22) Filed: Jun. 23, 2003

(65) Prior Publication Data
US 2004/0267809 A1 Dec. 30, 2004

(51) Int. Cl.
*G06F 17/30* (2006.01)
(52) U.S. Cl. .................. 707/202; 707/2; 707/10; 709/203; 709/213
(58) Field of Classification Search .......... 707/2, 707/10, 202, 101; 709/203, 213; 714/37
See application file for complete search history.

(56) References Cited

U.S. PATENT DOCUMENTS

| | | | | |
|---|---|---|---|---|
| 5,524,241 A * | 6/1996 | Ghoneimy et al. | ............ | 707/10 |
| 5,724,581 A * | 3/1998 | Kozakura | ............... | 707/202 |
| 5,924,096 A * | 7/1999 | Draper et al. | ............... | 707/10 |
| 6,014,673 A * | 1/2000 | Davis et al. | ............... | 707/202 |
| 6,078,930 A * | 6/2000 | Lee et al. | ............... | 707/202 |
| 6,192,365 B1 * | 2/2001 | Draper et al. | ............... | 707/101 |
| 6,321,348 B1 * | 11/2001 | Kobata | ............... | 714/37 |
| 6,662,176 B2 * | 12/2003 | Brunet et al. | ............... | 707/2 |
| 2003/0041103 A1 * | 2/2003 | Kobata | ............... | 709/203 |
| 2006/0089975 A1 * | 4/2006 | Iwamoto | ............... | 709/213 |

OTHER PUBLICATIONS

Oracle8i Recovery Manager User's Guide and Reference Release 2 (8.1.6), IEEE, pp. 1-26, 1996-2000.*
Agarwal, N. et al., "Synchronization of Distributed Multimedia Data in an Application-Specific Manner", *Proceedings ACM Multimedia*, 1994, 141-148.
Cho, J. et al., "Synchronizing a Database to Improve Freshness", *SIGMOD Record*, 2000, 29(2), 117-128.
Lee, C-H, et al., "Modeling of Two Distributed Schemes for Data Synchronization in a Computer Network", *Proceedings of the Eleventh Annual Simulation Symposium*, 1978, 293-304.

(Continued)

*Primary Examiner*—Thuy N Pardo
(74) *Attorney, Agent, or Firm*—Woodcock Washburn LLP

(57) ABSTRACT

The resynchronization of multiple copies of a database after a divergence in transaction history in provided. In an illustrative implementation, algorithms are provided for synchronizing multiple copies of a database upon the occurrence of a divergence in transaction history. A data environment is provided having a database and a copy. The database environment operating in a manner where the database records some transactions and the copy recording some later transactions, but neither having an up-to-date set of data or log of data changes. In operation, the database and its copy compare transaction log sequence numbers to discern the changes database and/or database copy pages. During resynchronization, the database and/or its copy sends page specific information about changes that have not been performed on each other respectively. In this manner, the data environment may be resynchronized with minimal data transmitted and without a requiring a complete restoration of the database.

46 Claims, 5 Drawing Sheets

OTHER PUBLICATIONS

Magrabi, F. et al., "Database Replication and Synchronization for Longitudinal Monitoring of ECG", *Proceedings of the First Joint BMES/EMBS Conference, IEEE Engineering in Medicine and Biology 21st Annual Conference and the 1999 Annual Fall Meeting of the Biomedical Engineering Society*, 1999, vol. 2, 1230.

Moore, D.J. et al., "Multiple Level Synchronization", *IBM Technical Disclosure Bulletin*, 1978, 21(2), 538-541.

Ramsden, R.J., "Database Synchronization in Military Command and Control Systems", *International Conference on Information-Decision-Action Systems in Complex Organizations*, 1992, 115-117.

Xiao, Z. et al., "Transactional Synchronization Based on Data Synchronization Object in Lite/2", *Journal of Software*, 2002, 13(5), 937-945 (English Language Abstract Attached).

* cited by examiner

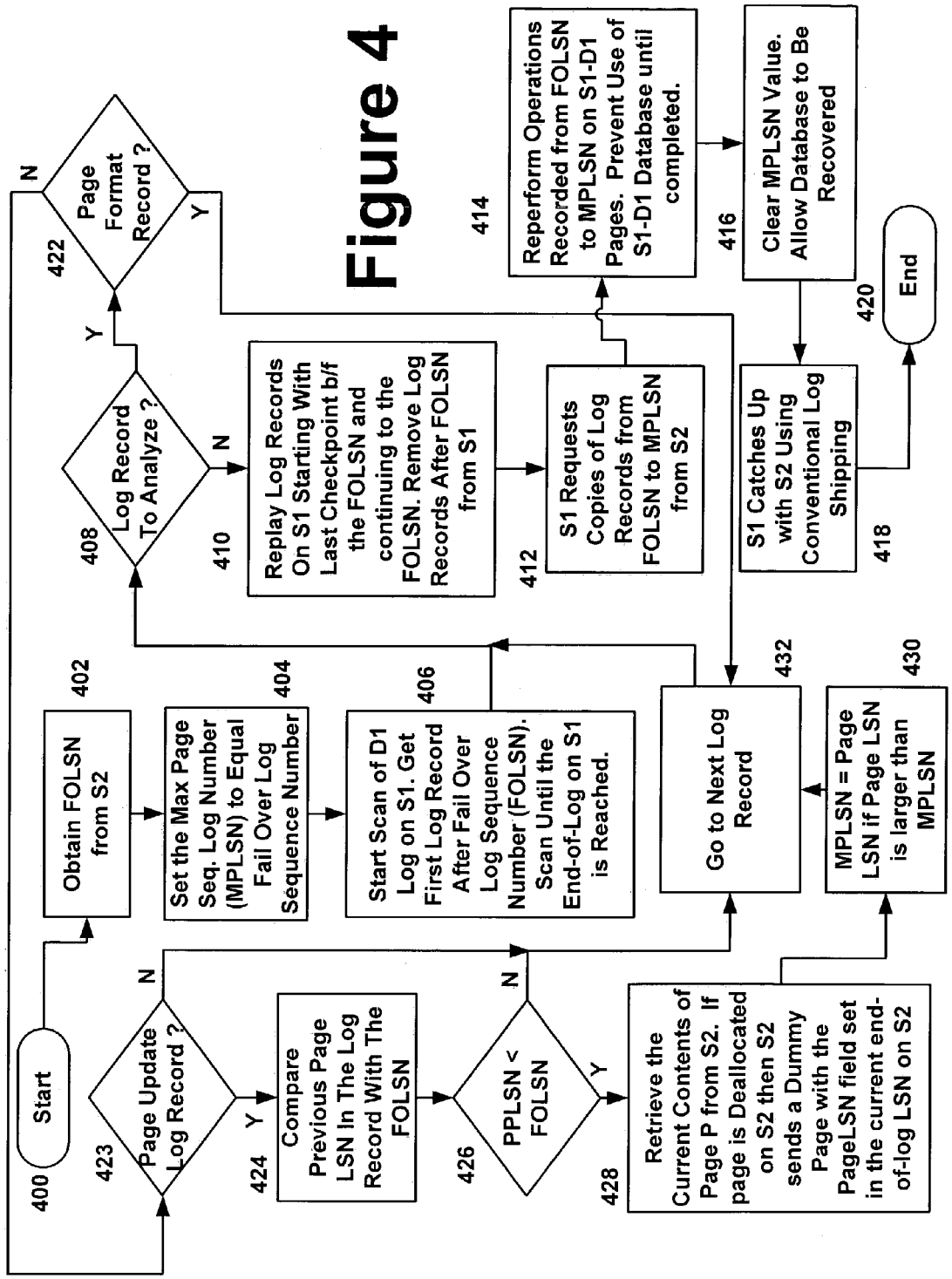

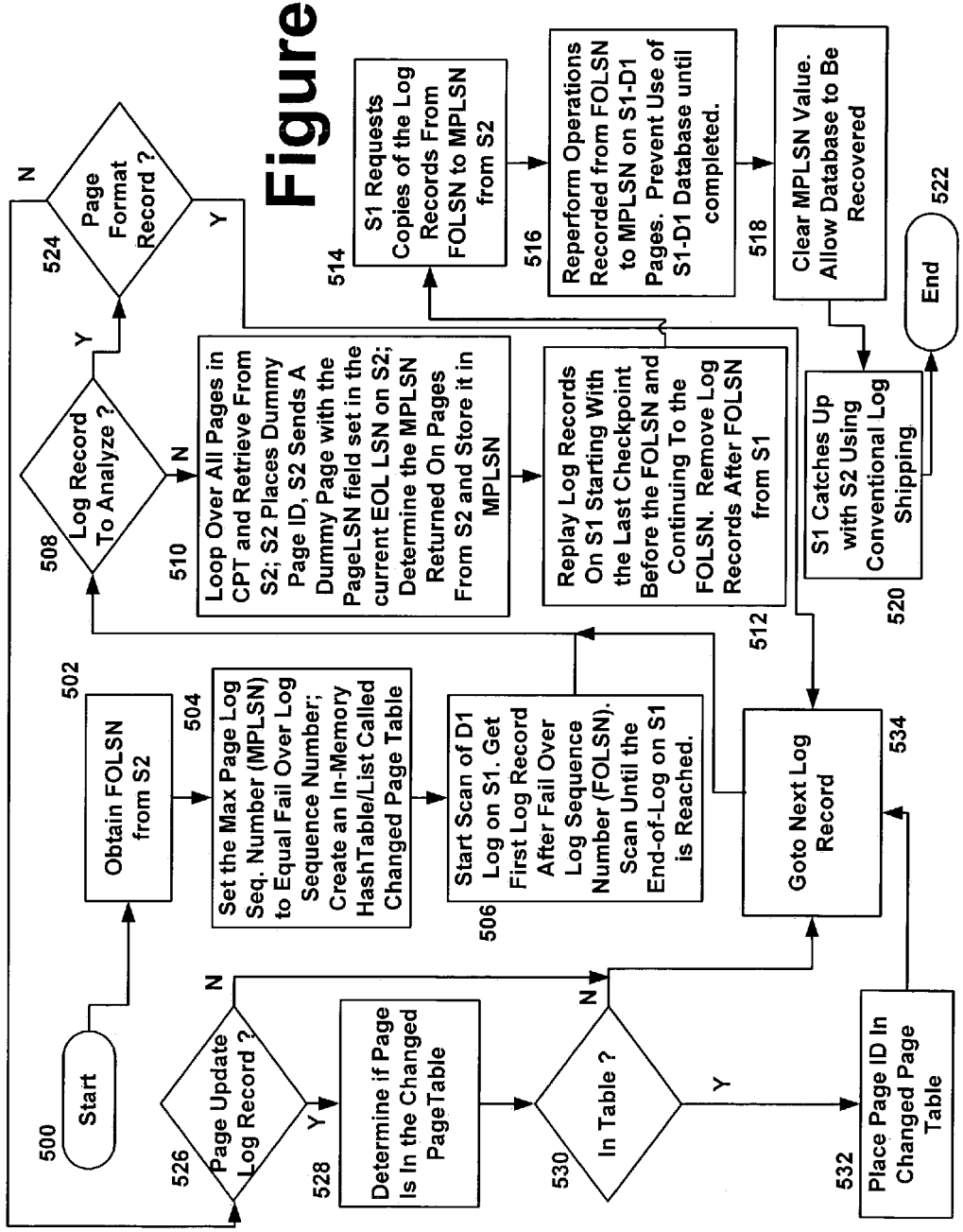

RESYNCHRONIZATION OF MULTIPLE COPIES OF A DATABASE AFTER A DIVERGENCE IN TRANSACTION HISTORY

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft, Inc.

FIELD OF THE INVENTION

The invention relates generally to electronic databases. More particularly, the invention relates to resynchronization of multiple copies of a database after a divergence in transaction history.

BACKGROUND OF THE INVENTION

Database systems often perform backup and restore operations to provide a safeguard for protecting critical data stored in databases. Backing up and restoring a database allows for the complete restoration of data over a wide range of potential system problems, including media failure, user errors, or loss of database servers. In addition, backing up and restoring databases is useful for other types of problems not related to the system itself, such as moving or copying a database from one server to another. By backing up a database from one computer and restoring it to another, a copy of a database can be made quickly and easily. Moreover, database systems can be configured such that there are multiple copies of the database operating on differing computers. Such configuration is preferred to have a real-time backup database just in case the primary database becomes corrupt or is non-operational, and also provides a way to offload query processing from a primary computer (the source server) to read-only destination servers.

Backup operations can be performed, for example, as database backups or transaction log backups. Backing up a database involves making a copy of the database that can be used to restore the database if it is lost. Everything in the database is copied, including any needed portions of the transaction log. The transaction log is a serial record of all the modifications that have occurred in a database and includes information as to which transaction performed each modification. The transaction log is used during restore operations to roll forward completed transactions and to roll back or undo uncompleted transactions. In the case where there are multiple copies of the database operating concurrently, the databases are kept synchronized through an operation known as log shipping, that is the process of feeding transaction logs from one database to another on a constant basis. Continually backing up the transaction logs from a source database and then copying and restoring the logs to a destination database keeps the destination database synchronized with the source database.

By contrast to a database backup, backing up a transaction log backs up only the changes that have occurred in the transaction log after a prescribed synchronization point. For database backup operations, this synchronization point might occur after data is copied from the database files, but before copying the portion of the transaction log that is needed to provide a transactionally consistent view of the data that was copied from the database files. For log backup operations, the synchronization point might occur before the log is copied to the backup media, i.e., roughly the start of the log backup operation. Hence, a database backup records the complete state of the data in the database at the time the backup operation is completed and a transaction log backup records the history of the transactions since the last time the log was backed up.

A restore operation involves the application of a backup set to a database. Restoring a database backup returns the database to the state in which it was when the backup was created. Any incomplete transactions in the database backup are rolled back to ensure that the database remains internally consistent. Incomplete transactions include any transactions that were not complete as of the above-described synchronization point. Restoring a transaction log backup reapplies all completed transactions that are in the transaction log to the database. When applying a transaction log backup, the transaction log is traversed, and all transactions in the log are rolled forward. When the end of the transaction log is reached, the database is restored to the state in which it was when the transaction log backup operation began. The restore operation then rolls back all transactions that were incomplete when the backup operation started.

Database backups, transaction log backups, and log shipping are advantageously used together to restore and synchronize multiple copies of a database to the point in time at which a failure occurred. Loss of data due to the failure can be greatly reduced or even eliminated entirely. In certain situations, using database backups, transaction log backups, and log shipping is highly desirable. For example, the practice is advisable in any situation in which any loss of changes after the last database backup is unacceptable. The use of transaction log backups is also indicated when the resources involved in performing only database backups are limited. In addition, transaction log backups are advantageous in cases in which it is desirable to return the database to some point in time before failure.

In addition, it is also advisable to use transaction log backups in cases in which changes to the database are frequent. When a large number of changes occur to the database over a relatively short period of time, the last database backup can become outdated quickly. Because transaction log backups typically use fewer resources than database backups, they can be created more frequently than database backups. Thus, the window of time in which a failure can occur after a backup is reduced, also reducing the amount of data that is potentially lost. Further, by applying transaction log backups, the database can be recovered to a specific point in time before a failure. This point in time need not be immediately before the failure.

To restore a database from both a database backup and one or more transaction log backups, the most recent database backup is typically restored. Next, the transaction log backups that were created after the most recent database backup are applied in the same order in which they were created. Although the use of transaction log backups increases recoverability, creating and applying them is also more complex than using database backups alone. Restoring a database using both database and transaction log backups works only if there is an unbroken sequence of transaction log backups after the last database or differential database backup. In the context of the resynchronization of copies of databases where there is an unbroken sequence of transaction log backups, a similar process is followed to restore the failed copy. Specifically, when one of the databases fails, the transaction log is shipped to the failed copy and a transaction log restore is performed.

Taking transaction log backups and restoring them on a copy of the database is only one type of log shipping. Another common type of log shipping, called real-time log shipping operates in manner where updates being performed and logged (e.g. through log records) on one copy of the database on one server are sent simultaneously to a copy of the database residing on a cooperating server such that the updates represented by sent log records are continuously being executed on the cooperating server. This process results in creating a mirror (identical copy) of the database.

One difficulty encountered in the context of log shipping is the possibility of database corruption in certain situations known as divergence in transaction histories. For example, given an environment wherein a database having two copies, a primary database D1 running on server S1, and a secondary copy of the database D1' running on server S2, a divergence in transaction history is a condition in which D1 fails for a period of time during which D1' remains operational, and wherein D1 is brought back online. As log shipping functions are terminated during the downtime of D1, this results in D1 and D1' becoming unsynchronized. FIG. 3 describes a divergence in transaction history in more detail in context to the example provided. As is shown, and indicated by block numbered 1, S1 and S2 are active. S1 generates log records labeled L1-L10 (as described by log sequence numbers—LSN1-10) and sends them to S2 where they are saved on disk and re-performed to keep D1' up-to-date with D1. A log sequence number (LSN) is an ID of a log record. LSNs are assigned to log records as the records are generated and each new log record is assigned an LSN that is greater that the previous LSN. At LSN=L10, S2 is shutdown or unavailable due to network failure. S1 continues to generate log records L11-L20 that affect database pages P1 and P2 (a database page is a unit of disk storage holding data records). In operation, Pages can be allocated (i.e. in use) or de-allocated (not in use). Pages also contain a pageLSN (page log sequence number) recording the ID of the last log record for an update to the page.

In the contemplated example it is then assumed at this point S1 becomes unavailable. S2 is brought back online to take over for S11 despite the fact that S2 does not have log records L11-L20. In this situation L10 is considered the point of divergence in transaction history. S2 will now generate a new set of log records labeled L11-30 that touch database pages P2 and P3. S1 and S2 are now divergent and require resynchronization.

The goal of resynchronization is to bring S1 and its database D1 back online so that they can become the mirror of D1' currently running on S2. To accomplish this feat, however, involves, removing all changes recorded on D1-S1 in the log records L11-L20. In practice such goal is accomplished by removing L11-L20 of S1 from the log and removing L11-L20 from the affected database pages (e.g.: P1 and P2) and restoring P1 and P2 to values they had at point L10 in the log or at some point after L10 from S2-D1'. From there, the log records L11-L30 from S2 can be copied to S1 and then replayed to bring S1-D1 up to date with S2-D1'.

Current practices require the backup of all of D1' and restore it to S1. Such practice is extremely inefficient for large databases and can be disruptive to S1 and S2's processing if these servers are geographically disparate. Even with current practices, conventional database systems cannot reliably and efficiently rectify the resynchronization of database copies upon a divergence in transaction history condition as in most cases manual data operations are required. From the foregoing it is appreciated that there exists a need to overcome the prior art.

SUMMARY OF THE INVENTION

The resynchronization of multiple copies of a database after a divergence in transaction history is provided. In an illustrative implementation, a database D1, having database pages, and its copy D1' operate on two disparate computing environments, S1 and S2, respectively. The database and its copy operate to maintain synchronization through the practice of log shipping. Upon the occurrence of a divergence in transaction history, the location of the divergence is determined, called the failover log sequence number (FOLSN) from S2. A log scan is then performed to determine if any changes were made in the database since the occurrence of the divergence.

If there are log records in the transaction history after the FOLSN on S1, a scan of the log is initiated starting at the FOLSN. For each record, if the log record is a page format log record and a page update log record, a comparison occurs between the previous page log sequence number (PPLSN) which is stored in the in the log record and the FOLSN. If the PPLSN is less than the FOLSN, the current content of the page on S2 is retrieved and sent to S1. If the page is de-allocated on S2, then S2 sends a dummy page with a page LSN field set in the current end-of-log LSN on S2. For all pages received from S2, the maximum page LSN (MPLSN) is updated with the MPLSN from S2. The next record in the transaction history is then processed according to the above described steps of the illustrative implementation.

Upon completion of the log scan, the log records on database D1 are replayed starting with the database's last checkpoint before the FOLSN and continuing to the FOLSN. The log records after the FOLSN are then removed from S1. Copies of the log records from the FOLSN to the MPLSN are copied from S2 to S1. The operations recorded from the FOLSN to the MPLSN on S1-D1 pages are re-performed on S2. The MPLSN is cleared and the database is allowed to recover. S1 then catches up with S2 using log shipping.

In an alternate illustrative implementation, upon the occurrence of a divergence in transaction history, the location of the divergence is determined, called the failover log sequence number (FOLSN) from S2. the MPLSN is set to equal the FOLSN and an in-memory hashtable/list (e.g. Changed Page Table—CPT) is created. A scan is then performed to determine if any changes were made in the database since the occurrence of the divergence.

If there are log records in the transaction history after the FOLSN on S1, a scan of the log is initiated starting at the FOLSN. For each record, the type of log record is determined. If the log record is a page format log record and a page update log record, a check is performed to determine if the page associated with the log record is in the CPT. If the page is in not in the CPT, the page ID is placed in the CPT. The next record in the transaction history is then processed according to the above described steps of the alternate illustrative implementation.

Upon completion of the log scan, the pages in the CPT are retrieved from S2 and S2 places a dummy page ID and sends a dummy page with the page LSN field set in the current end-of-log (EOL) LSN on S2. Also, the MPLSN returned on the pages from S2 is determined and stored in the MPLSN value. The log records are then replayed on S1 starting with the last checkpoint before the FOLSN and continuing to the FOLSN. The log records occurring after the FOLSN are then removed from S1. Copies of the log records from the FOLSN to a maximum page log sequence number (MPLSN) are copied from S2 to S1. All of the operations recorded from the FOLSN to the MPLSN on S1-D1 pages are re-performed on S2. The MPLSN is cleared and the database is allowed to recover. S1 then catches up with S2 using log shipping.

Other aspects of the invention are described below.

BRIEF DESCRIPTION OF THE DRAWINGS

The system and methods for the resynchronization of multiple copies of a database after a divergence in transaction history are further described with reference to the accompanying drawings in which:

FIG. 4 is a flowchart diagram of exemplary processing performed to resynchronize multiple copies of a database after a divergence in transaction history; and FIG. 5 is a flowchart diagram of alternate exemplary processing performed to resynchronize multiple copies of a database after a divergence in transaction history.

DETAILED DESCRIPTION OF ILLUSTRATIVE IMPLEMENTATION

Figure 1:
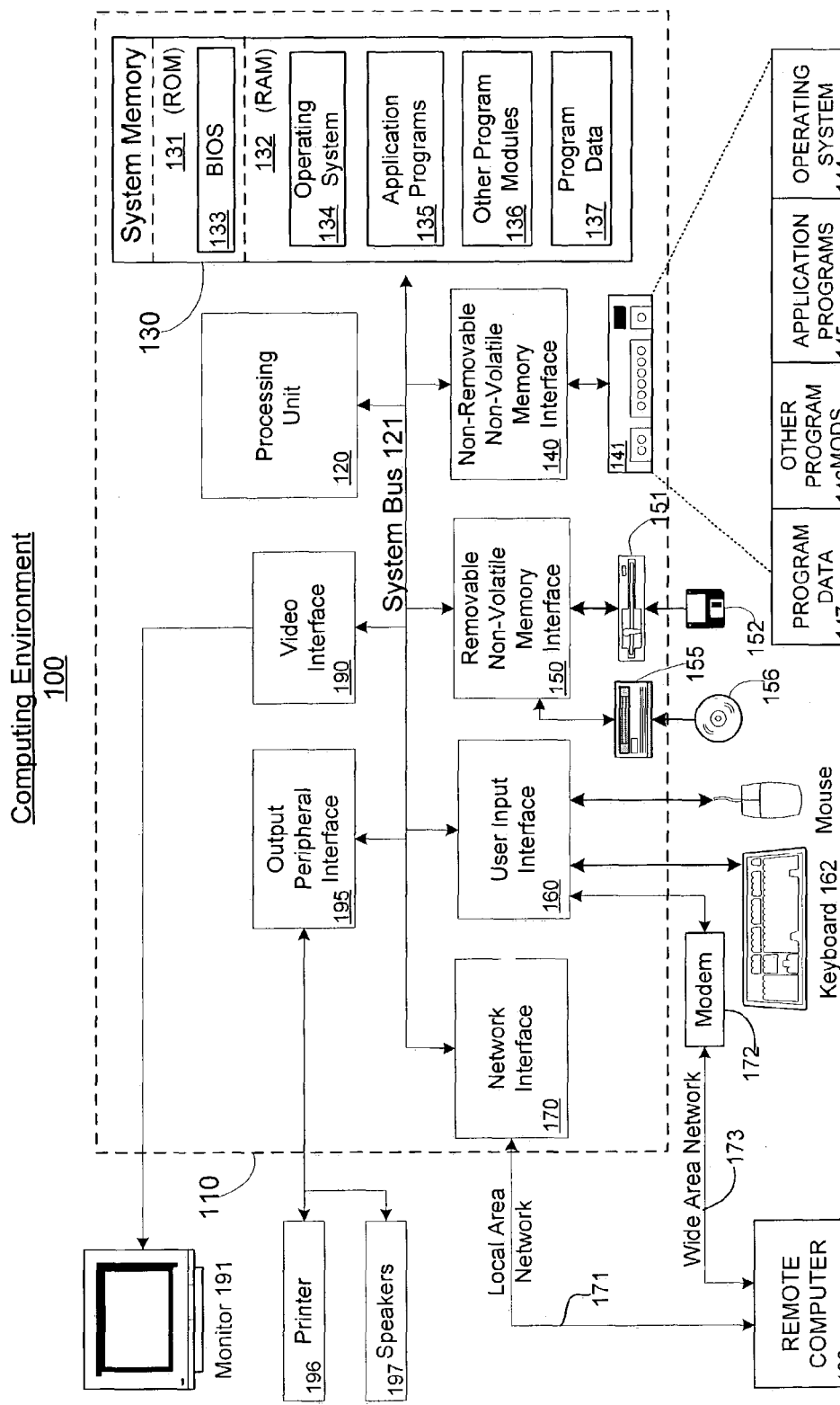
FIGS. 1 and 2 are schematic illustrations of exemplary computing environments suitable for the present invention, with FIG. 2 depicting an exemplary networked computing environment.

Overview:

In the currently released database applications there exists a feature known as log shipping that involves shipping the transaction log for a database D1 from one database server process, S1, to a second database server process, S2, over a network connection. Transactions are performed on S1 and the log for the transactions is sent to S2 where it is redone/replayed to keep S2-D1 synchronized with S1-D1. In this arrangement, S1 is said to have the primary role as it performing the transactions and S2 has the secondary role. This allows for S2 to take over for S1 (i.e. S2 becomes the primary), for example if S1 fails and goes down or if the disks on S1 fail making S1-D1 unavailable. The point in the transaction log where S1 stops generating log records and S2 takes over is called a failover point. When S1 becomes available again, S2 can ship the log it has generated since the failover point back to S1 with S1 in the role of secondary.

In a log shipping system it is possible for S1 to be ahead of S2, for example if the network connection to S2 is down. If S1 is ahead of S2 and S1 has a failure which requires it to be offline, an administrator may choose to for S2 to come online, effectively losing all transaction history performed on S1 since the last time S1 and S2 were communicating and in sync. This situation is called a divergence in transaction history, because at the time S2 takes over as primary it diverges from the transaction history recorded on S1. A divergence in transaction history is also possible even in normal operations where both S1 and S2 are operational because S1 may have generated log records and written them to disk, but they may not yet have been received by S2.

A divergence in transaction history involves not only the transaction log, but also the data in the databases. Records in database tables are stored on disk pages and the transaction log contains the history of changes to pages and records. Thus the pages in the S1 have had different operations performed on them compared to S2.

However, when there is no communication mechanism between S1 and S2, a divergence in transaction history can only be resolved by restoring the entire database on S1 and carefully restoring transaction log backups taken on S1 and S2. This is a time and resource intensive process that can leave S2 without a secondary server for many hours.

The herein described systems and methods provide the restoration of database D1 on S1 in the above description to a state where all effects of transactions after the failover log sequence number are removed and S1 is prepared to receive transaction log from S2. To be precise the actual point that D1 is taken back to is some time after the failover log sequence number.

It is appreciated that although the herein described systems and methods are described in the context of the a divergence in transaction history occurring in a data environment having a particular configuration, that deployment techniques may be utilized in various ways that go beyond the scope of the provided examples.

A. Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. Exemplary Networked Computing Environment

Figure 2:
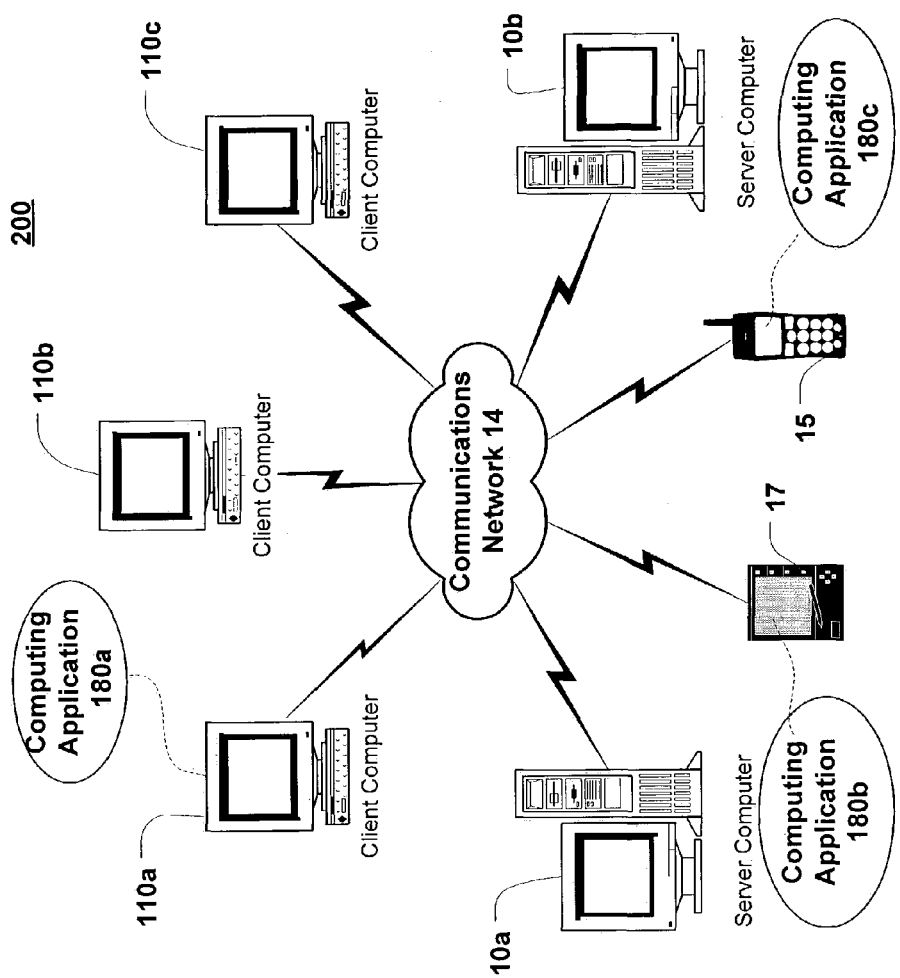
Figure 3:
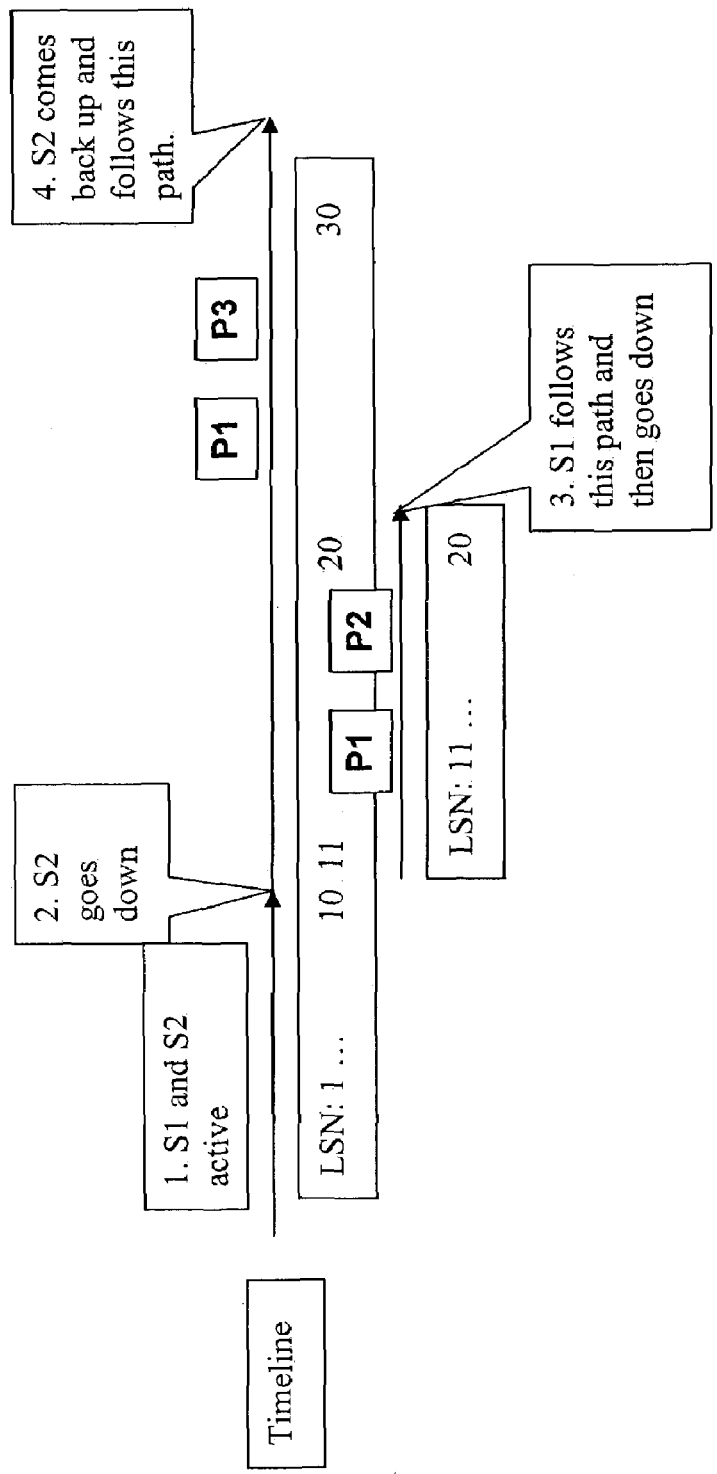
FIG. 3 is a block diagram showing a divergence in transaction history occurring between multiple copies of a database.

Computer environment 100, described above, can be deployed as part of a computer network. In general, the above description for computers applies to both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 14 (which may be a LAN, WAN, intranet, the Internet, or other computer network) with a number of client computers 20a, 20b, 20c, or computing devices, such as, mobile phone 15, land-line telephone 16, and personal digital assistant 17. In a network environment in which the communications network 160 is the Internet, for example, the servers 10 can be Web servers with which the clients 20 communicate via any of a number of known protocols, such as, hypertext transfer protocol (HTTP) or wireless application protocol (WAP). Each client computer 20 can be equipped with browser 180a to gain access to the servers 11. Similarly, personal digital assistant 17 can be equipped with browser 180b and mobile phone 15 can be equipped with browser 180c to display and receive various data.

In a typical database system, a user (not shown) may interact with a computing application (e.g. database system) running on a server computing devices. The interaction involves reading and writing the data in units called transaction. In an exemplary environment, the transactions may be performed on one server (S1) and shipped to a second server (S2) where they are used to keep an up-to-date copy of the database. The transaction logs and log sequence numbers may be stored on server computers and communicated to cooperating servers (running cooperating database applications) over communications network 14. S1 and S2 may perform the resynchronization of multiple copies of a database after a divergence in transaction history. A user may initiate or monitor in the resynchronization activities by interfacing with computing applications through client computing devices. These transactions may be communicated by client computing devices to server computers for processing and storage.

Thus, the herein described systems and methods can be utilized in a computer network environment having a plurality of server computers in communication and interaction with each other. However, the systems and methods described herein can be implemented with a variety of network-based architectures, and thus should not be limited to the example shown. The herein described systems and methods will now be described in more detail with reference to a presently illustrative implementation.

C. Resynchronization After Divergence in Transaction History

The herein described systems and methods cover a technique to do complete resynchronization by moving only a minimal amount of database pages (a database page is a unit of disk storage holding data records) and log from a database copy and without requiring the storage of the complete list of the database pages to move. The implementations described below exploit the placement of a "previousPageLSN" (previous page log sequence number—where a log sequence number is an ID of a log record. LSNs are assigned to log records as the records are generated and each new log record is assigned an LSN that is greater that the previous LSN) field in every log record that updates a database page. The previousPageLSN field contains the value of the pageLSN field (PageLSN—each page contains the LSN of the last log record to update the page) on the page at the time the log record was generated for the page. Effectively this chains together the log records affecting a particular page.

FIG. 4 shows exemplary processing performed to address a divergence in transaction history occurring in exemplary data environment. For the purposes to describe the processing performed a data environment is assumed having two servers S1 and S2 operating a database D1 and its mirror copy D1'. It is also assumed that a divergence in transaction history occurs between D1 and D1' such that they are no longer synchronized. As shown, processing begins and proceeds to block 402 where the fail over log sequence number (FOLSN) is obtained. Processing proceeds to block 404 where the variable Max Page Log Sequence Number (MPLSN) is set equal to the FOLSN. A scan is then performed at block 406 on the log of D1 operating on S1 until the End-of-Log (EOL) on S1 is reached and where the first log record after the FOLSN is obtained.

A check is then performed at block 408 to determine if there is log record to analyze. If there is no log record to analyze, processing proceeds to block 410 where the log records on S1 are replayed starting with the last checkpoint before the FOLSN and continuing to the FOLSN. Also at block 410, the log records after the FOLSN are removed from S1. S1 then requests copies of the log records from the FOLSN to the MPLSN from S2 at block 412. From there processing proceeds to block 414 where the operations recorded from FOLSN to the MPLSN on S1-D1 pages are re-performed and where the operation of S1-D2 database is prevented (e.g. to ensure physical consistency of D1). The MPLSN value is cleared at block 416, in addition to the database is allowed to be recovered (e.g. according to conventional database recovery techniques). S1 then catches up with S2 using conventional log shipping at block 418. From there processing terminates at block 420.

However, if at block 408, it is determined that there is a log record to analyze, processing proceeds to block 422 where a check is performed to determine if the log record is a page format record. If the check at block 422 yields that the log record is not a page format record, processing proceeds to block 423 where a check is performed to determine if the log record is a page update log record.

If the check at block 423 yields that the log record is a page update log record, processing proceeds to block 424 where the previous page log sequence number (PPLSN) of the log record is compared with the FOLSN.

A check is then performed to determine if the PPLSN is less than the FOLSN. If the PPLSN is less than the FOLSN, processing proceeds to block 428 where the contents of page P (i.e. the page affected by this log record) from S2 are retrieved. If the page is de-allocated on S2 then S2 sends a Dummy Page with the PageLSN field set in the current end-of-log (EOL) LSN on S2. The MPLSN is set equal to the Page LSN if the Page LSN is larger than the MPLSN at block 430.

Processing then proceeds to block 432 where the next log record is located. From there processing reverts to block 408 and proceeds there from.

If however, at block 422, the check yields that the log record is a page format record, processing reverts to block 432 and proceeds there from. Similarly, if at block 423 the check yields that the log record is not a page update log record, processing reverts to block 432 and proceeds there from. Lastly, if the check performed at block 426 yields that the PPLSN is greater than or equal to the FOLSN, processing reverts to block 432 and proceeds there from.

It is appreciated that although the exemplary processing is described in context to a particular data environment configuration that such processing can be extended to various data environments having various configurations. For example rather than two servers, there could be only one server maintaining both copies of the database running the entire algorithm from one database application process.

FIG. 5 shows alternate exemplary processing performed to address a divergence in transaction history occurring in exemplary data environment. For the purpose of describing the processing performed a data environment is assumed having two servers S1 and S2 operating a database D1 and its mirror copy D1'. It is also assumed that a divergence in transaction history occurs between D1 and D1' such that they are no longer synchronized. As shown, processing begins at block 500 and proceeds to block 502 where the FOLSN is obtained from S2. Processing then proceeds to block 504 where the MPLSN is set equal to the FOLSN and an In-Memory HashTable/List called the Changed Page Table (CPT) is created. A scan of the D1 log on S1 is performed at block 506, starting at the first log record after the FOLSN until the end-of-log on S1 is reached.

A check is then performed at block 508 to determine if there is a log record to analyze. If there is no log record, processing proceeds to block 510 where all of the pages in the CPT are retrieved from S2. In addition, at block 510, S2 places a dummy page ID and sends a dummy page with the Page LSN field set to the current end-of-log LSN on S2 to S1. Further at block 510, the MPLSN, returned from S2, is stored in the MPLSN variable. Processing then proceeds to block 512 where the log records are replayed on S1 starting with the last checkpoint before the FOLSN and continuing to the FOLSN. Also at block 512, the log records on S1 which have LSNs values occurring after the FOLSN are removed. From there, processing then proceeds to block 514 where S11 requests copies of the log records from the FOLSN to MPLSN from S2. The operations recorded from the FOLSN to the MPLSN on S1-D1 are then re-performed at block 516. In addition, at block 516, the S1-D1 database is prevented from being used until all of the operations are re-performed (e.g. to ensure database consistency between D1 and D1').

The MPLSN value is then cleared at block 518, and the database is allowed to be recovered. S1 then catches up with the S2 using conventional log shipping. Processing then terminates at block 522.

If, however, at block 508, the check yields that there are log records to analyze, processing proceeds to block 524 where a check is performed to determine if the log record is page format log record. If at block 524 it is determined that the log record is a not page format log record, processing proceeds to block 526 to determine if the log record is a page update log record. If at block 526, it is determined that the log record is a page update log record, processing proceeds to block 528, where it is determined if the page associated with the log record is contained in the Changed Page Table (CPT). A check is then performed at block 530 to determine if the page is in the CPT. If the page is in the CPT, processing proceeds to block 532 where the page ID for the page is placed in the CPT. Processing then proceeds to block 534 where the next record in the transaction is processed. From there processing reverts to block 508 and proceeds there from.

If, however, at block 524 it is determined that the log record is a page format record, processing proceeds to block 534 and proceeds there from. Similarly, if at block 526 it is determined that the log record is not a page update log record, processing reverts to block 534 and proceeds there from. Lastly, if at block 530, it is determined that the page is not in the CPT, processing proceeds to block 534 and proceeds there from.

It is appreciated that although the exemplary processing is described in context to a particular data environment configuration that such processing can be extended to various data environments having various configurations.

As described, a database consists of data files to store data pages and log files to store transaction log records. While the database is running, files may be added, dropped, grown and shrunk. The herein described systems and methods can also be applied to handle the add/drop/grow/shrink of data and log files during resynchronization. To this end, the resynchronization of files and their sizes may be accomplished according to the following size-conscious resynchronization method. The above-described exemplary database environment is used to describe the size-conscious resynchronization method. First, a list of all of the files and sizes from S2 are obtained. The end-of-log LSN on S2 is stored when the list is computed. For each file that exists on S2 but that do not exist on S1, create a file on S1. For each file that is smaller on S1 than the corresponding file on S2, increase the size on S1 to match S2. Perform resynchronization according to the processing described by FIG. 4 or 5. For each file on S1 that does not exist on S2, remove the file from S1. Lastly, for each file on S1 that is larger than the corresponding file on S2, shrink the file on S1 to match S2.

D. Conclusion

In sum, the herein described systems and methods provide the resynchronization of multiple copies of a database after a divergence in transaction history. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wirless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed:

1. A method for resynchronizing multiple copies of a database after a divergence in transaction history, the database, D1, and its copies, D1', having database pages, logs, and log records, comprising:

identifying a point when the divergence in transaction history occurred using the database and database copy logs, the point represented by a fail over log sequence number (FOLSN), wherein the divergence in transaction history comprises at least one of:

a condition in which D1 fails for a period of time during which D1' remains
operational, and D1 is brought back online; or
a condition in which D1 has provided data to the database and the data has not been
received by D1'; and
processing the database log records created after the divergence in transaction history to populate from D1 to D1' or from D1' to D1 changes and identified content, the log records having log sequence numbers for use in processing.

2. The method as recited in claim 1, further comprising setting a maximum page log sequence number (MPLSN) to equal the FOLSN.

3. The method as recited in claim 2, further comprising performing a scan of the log of either of D1 or D1' to obtain a first log record that occurs after the FOLSN until an end-of-log on either of D1 or D1' is reached.

4. The method as recited in claim 3, further comprising checking to determine if there is a log record to analyze.

5. The method as recited in claim 4, further comprising replaying log records on D1 starting with log records occurring before an identified last checkpoint before the FOLSN and continuing to the FOLSN.

6. The method as recited in claim 5, further comprising removing the log records after the FOLSN from either of D1 or D1'.

7. The method as recited in claim 6, further comprising copying log records from the FOLSN to the MPLSN from D1 to D1' or from D1' to D1.

8. The method as recited in claim 7, further comprising performing operations recorded from the FOLSN to the MPLSN on D1 or D1' pages.

9. The method as recited in claim 8, further comprising preventing the use of D1 or D1' until the operations of claim 8 are completed.

10. The method as recited in claim 9, further comprising clearing a MPLSN value.

11. The method as recited in claim 10, further comprising recovering D1 and/or D1'.

12. The method as recited in claim 11, further comprising catching up D1 with D1' or vice versa.

13. The method as recited in claim 4, further comprising determining if the log record occurring after the FOLSN is a page format log record.

14. The method as recited in claim 4, further comprising determining if the log record occurring after the FOLSN is a page update log record.

15. The method as recited in claim 14, further comprising comparing a previous page log sequence number (PPLSN) of the log record occurring after the FOLSN with the FOLSN.

16. The method as recited in claim 15, further comprising upon determining that the PPLSN is less than the FOLSN, retrieving current contents of the D1 pages or D1' pages.

17. The method as recited in claim 16, further comprising determining if the D1 pages or D1' pages are de-allocated.

18. The method as recited in claim 17, further comprising sending a dummy page from D1 to D1' or from D1' to D1 with a page LSN (PLSN) field of the log record set in a current end-of-log (EOL) log sequence number on D1 or D1'.

19. The method as recited in claim 18, setting a value of the MPLSN to the value of the PLSN if the PLSN is larger than the MPLSN.

20. The method of claims 13, 14, or 19, further comprising obtaining a next log record.

21. A computer readable medium having computer readable instructions to instruct a computer to perform the method as recited in claim 1.

22. A system for resynchronization of a database having multiple copies after an occurrence of a divergence in transaction history comprising:
database log records, the database log records comprising log sequence numbers representative of database operations and transactions;
a means for identifying a point of the divergence in transaction history, operating on the database log records and log sequence numbers to identify the divergence in transaction history, wherein the divergence in transaction history comprises at least one of:
a condition in which D1 fails for a period of time during which D1' remains
operational, and D1 is brought back online; or
a condition in which D1 has provided data to the database and the data has not been
received by D1'; and
a means for comparing information about the log records, the means for comparing using page sequence numbers and fail over sequence numbers to determine if changes have been made to the log records after the divergence in transaction history.

23. The system as recited in claim 22, wherein the means for identifying comprises a computing application.

24. The system as recited in claim 22, wherein the means for comparing information comprises a computing application.

25. A method for resynchronizing multiple copies of a database after a divergence in transaction history, the database, D1 operating on server computer S1, and its copies, D1' operating on server computers S2, having database pages, logs, and log records, comprising:
identifying the divergence in transaction history, the divergence represented by a log sequence number (LSN), wherein the divergence in transaction history comprises at least one of:
a condition in which D1 fails for a period of time during which D1' remains
operational, and D1 is brought back online; or
a condition in which D1 has provided data to the database and the data has not been
received by D1';
on the server computer being recovered, scanning a log file to identify a set of pages to be replaced;
replacing those pages on the server computer being recovered with their images from a non-recovering server computer;
rolling forward a transaction log from a last checkpoint through a failover LSN on any of those pages being replaced on the server computer being recovered;
copying the log and log records from the non-recovering server computer from the failover LSN to a maximum LSN; and
replaying the copied log records.

26. A method for resynchronizing multiple copies of a database after a divergence in transaction history, the database, D1, and its copies, D1', having database pages, logs, and log records, comprising:
identifying a point when the divergence in transaction history occurred using the database and database copy logs, the divergence represented by a fail over log sequence number (FOLSN), wherein the divergence in transaction history comprises at least one of:

a condition in which D1 fails for a period of time during which D1' remains operational, and D1 is brought back online; or a condition in which D1 has provided data to the database and the data has not been received by D1';

creating a list of pages having been changed; and processing the database log records created after the divergence in transaction history to populate from D1 to D1' or from D1' to D1 changes and identified content, the log records having log sequence numbers for use in processing.

27. The method as recited in claim 26, further comprising setting the MPLSN to equal the FOLSN.

28. The method as recited in claim 27, further comprising creating an in-memory hash table, the in-memory hash table having data identifying database pages which have changed.

29. The method as recited in claim 28, further comprising scanning the log of D1 or D1' to obtain a first log record occurring after the FOLSN, wherein the scan is performed until an end-of-log (EOL) log sequence number is encountered.

30. The method as recited in claim 29, further comprising performing a check to determine if there is a log record to process.

31. The method as recited in claim 30, further comprising upon determining there are no log records to process, looping over the pages found in the Changed Page Table (CPT) and copying them to D1 or D1'.

32. The method as recited in claim 31, further comprising sending a dummy page and dummy ID by D1 to D1' or from D1' to D1, the dummy page having a page LSN (PLSN) being set to the EOL LSN on D1 or D1'.

33. The method as recited in claim 32, further comprising determining the MPLSN returned on pages from D1 or D1' and store it in the MPLSN.

34. The method as recited in claim 33, further comprising replaying the log records on D1 or D1' starting with a last checkpoint before the FOLSN and continuing to the FOLSN.

35. The method as recited in claim 34, further comprising removing log records occurring after the FOLSN from D1 or D1'.

36. The method as recited in claim 35, further comprising copying the log records from the FOLSN to the MPLSN from D1 to D1' or D1' to D1.

37. The method as recited in claim 36, further comprising re-performing operations recorded from the FOLSN to the MPLSN on D1 or D1' pages.

38. The method as recited in claim 37, further comprising preventing the use of D1 or D1' until the operations of claim 37 are completed.

39. The method as recited in claim 38, further comprising clearing a MPLSN value.

40. The method as recited in claim 39, further comprising recovering D1 and/or D1'.

41. The method as recited in claim 40, further comprising performing log shipping between D1 and D1'.

42. The method as recited in claim 30, further comprising determining if the log record is a page format record.

43. The method as recited in claim 42, further comprising determining if the log record is a page update log record.

44. The method as recited in claim 43, further comprising determining if the page is in the Changed Page Table (CPT).

45. The method as recited in claim 44, further comprising placing a page ID in the Changed Page Table (CPT).

46. The method as recited in claim 30, 43, or 44, further comprising obtaining a next log record.

* * * * *